June 11, 1963
J. B. REID ETAL
3,092,861
METHOD FOR ASSEMBLING AN INSOLE WITH A LAST
Filed Feb. 21, 1962
8 Sheets-Sheet 2
*FIG. 2A*
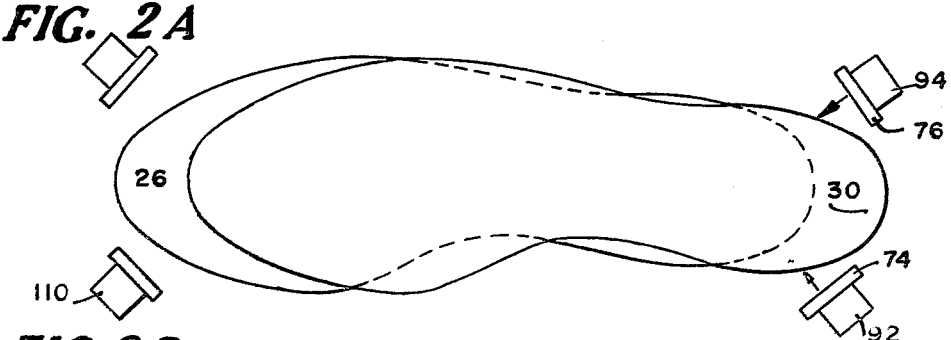
*FIG. 2B*
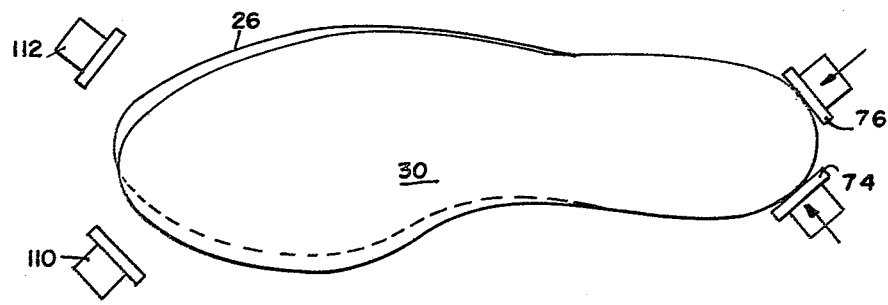
*FIG. 2C*
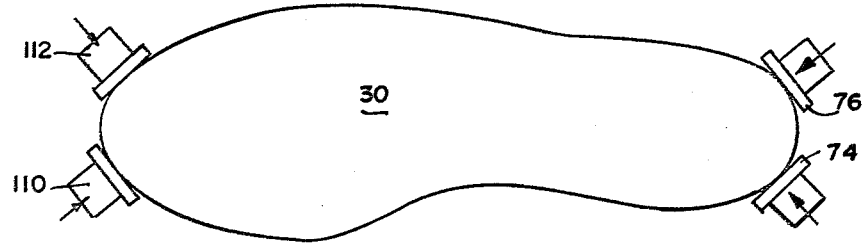
*FIG. 8A*  *FIG. 8B*
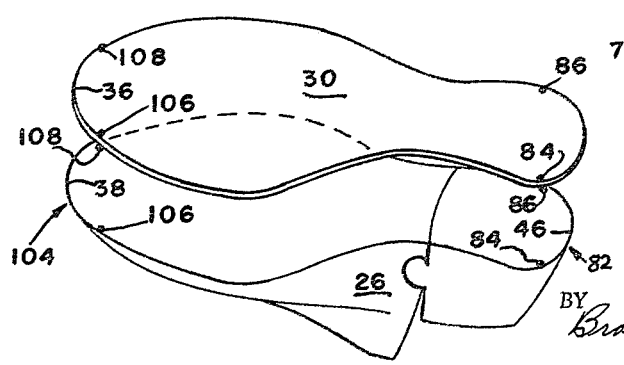
INVENTORS
ROBERT A. SPENCE
JOHN B. REID
BY *Browne, Schuyler & Beveridge*
ATTORNEYS June 11, 1963   J. B. REID ETAL   3,092,861
METHOD FOR ASSEMBLING AN INSOLE WITH A LAST
Filed Feb. 21, 1962   8 Sheets-Sheet 3

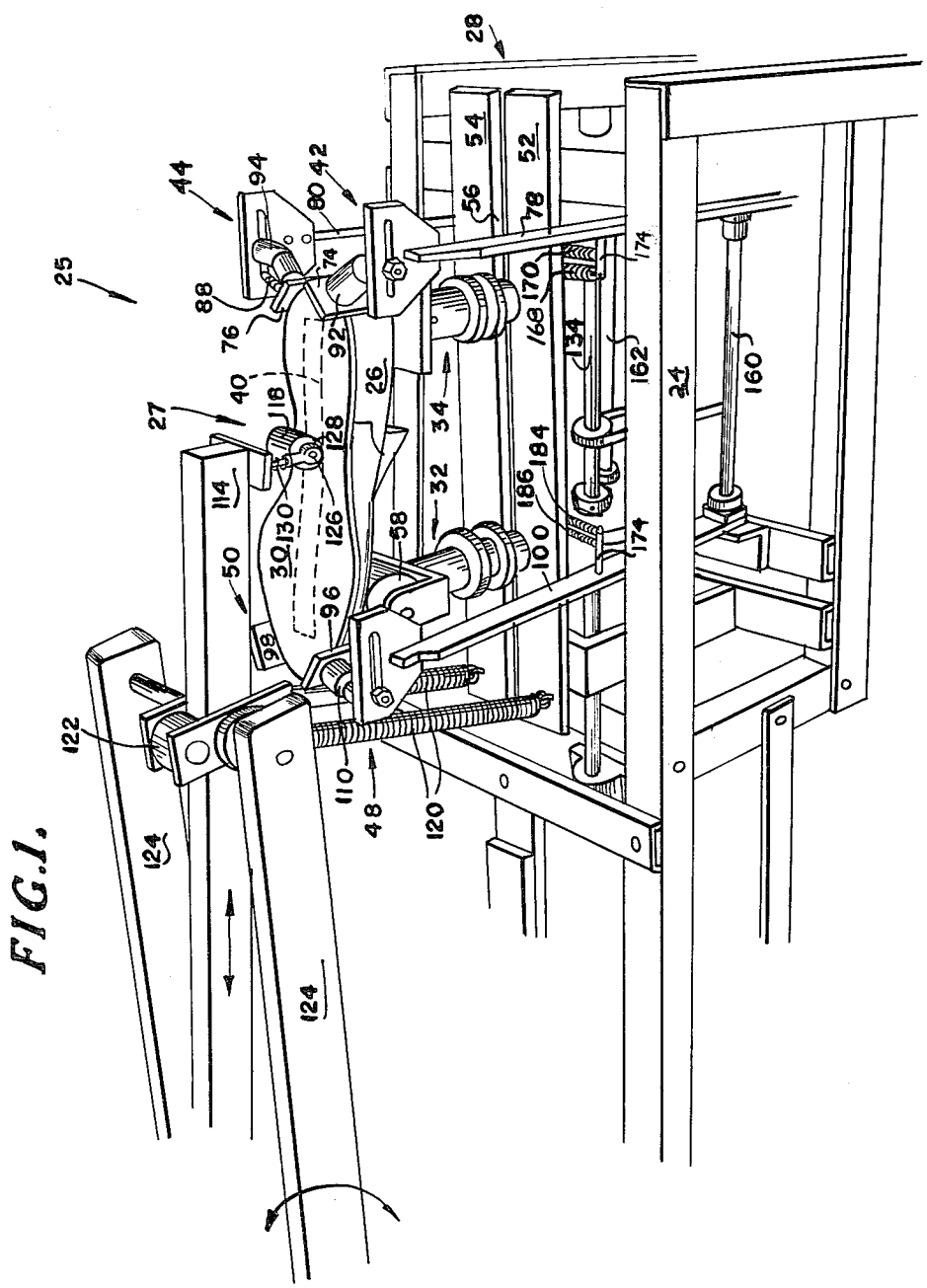

INVENTORS
ROBERT A. SPENCE
JOHN B. REID

BY Browne, Schuyler & Beveridge
ATTORNEYS

INVENTORS
ROBERT A. SPENCE
JOHN B. REID

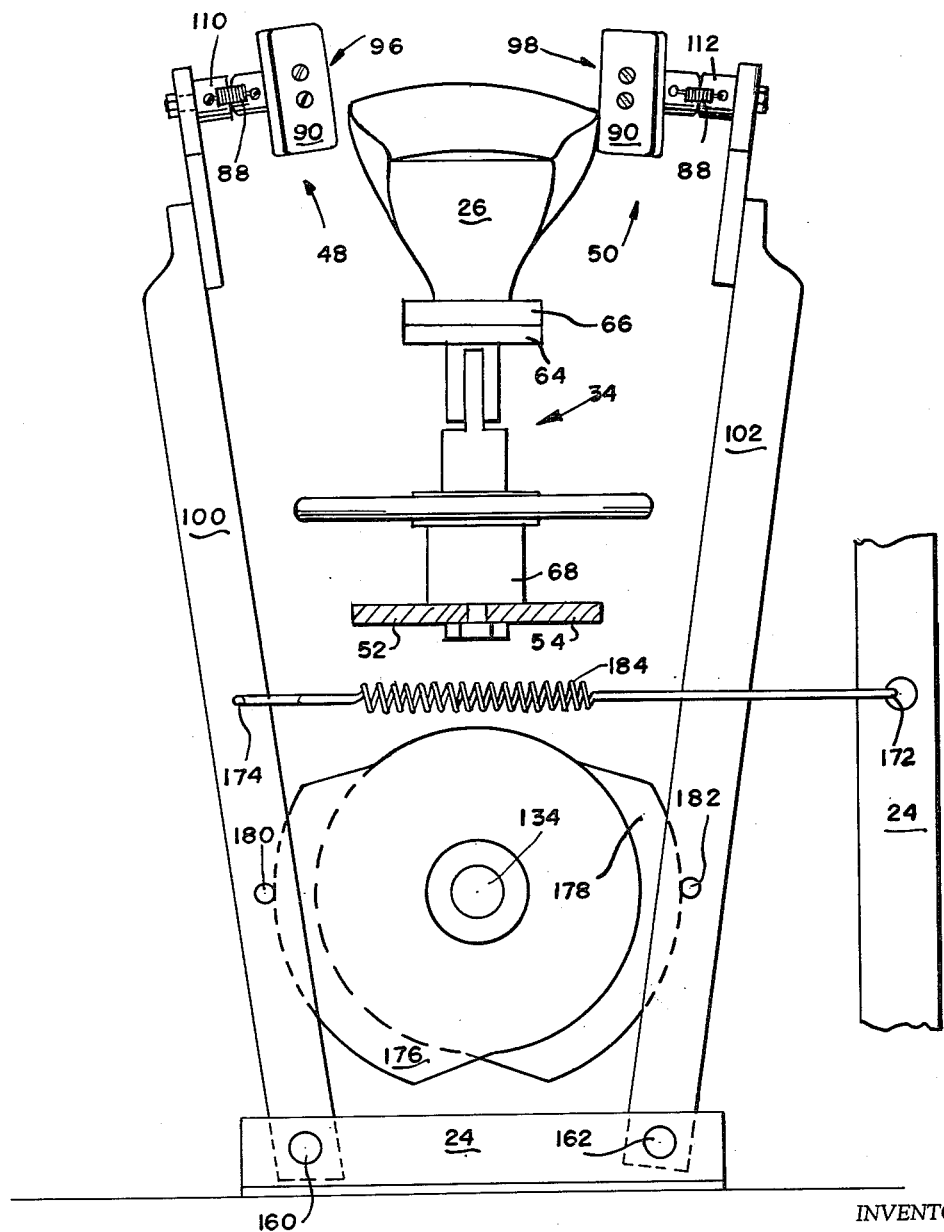

June 11, 1963  J. B. REID ETAL  3,092,861
METHOD FOR ASSEMBLING AN INSOLE WITH A LAST
Filed Feb. 21, 1962  8 Sheets-Sheet 6

INVENTORS
ROBERT A. SPENCE
JOHN B. REID

BY Browne, Schuyler & Beveridge
ATTORNEYS

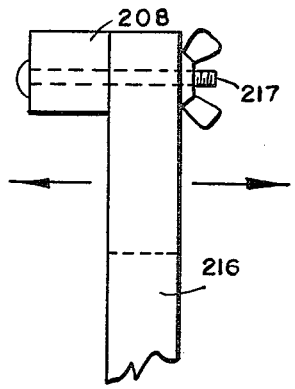
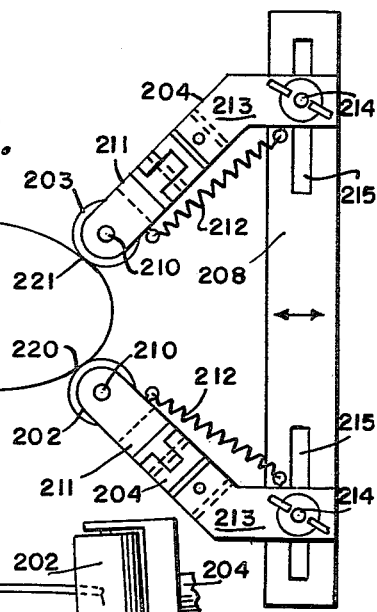
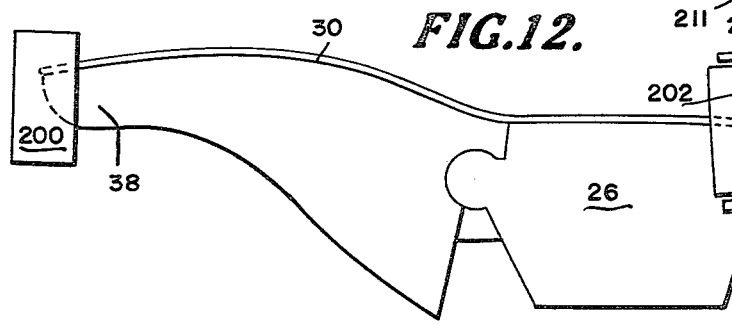
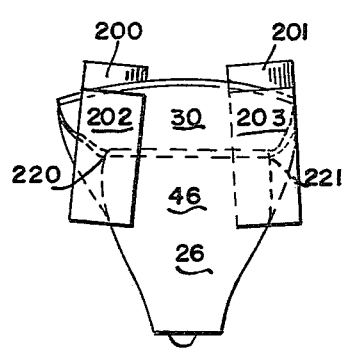

June 11, 1963  J. B. REID ETAL  3,092,861
METHOD FOR ASSEMBLING AN INSOLE WITH A LAST
Filed Feb. 21, 1962   8 Sheets-Sheet 8
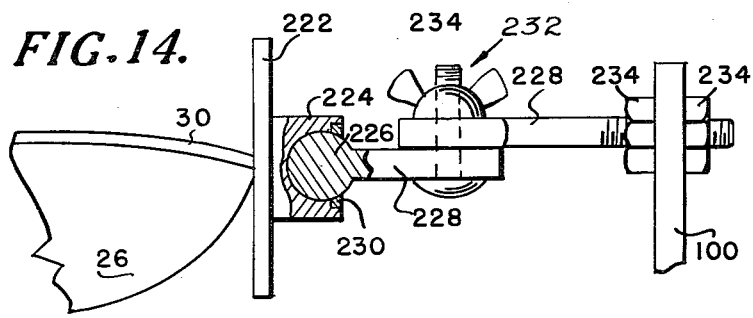
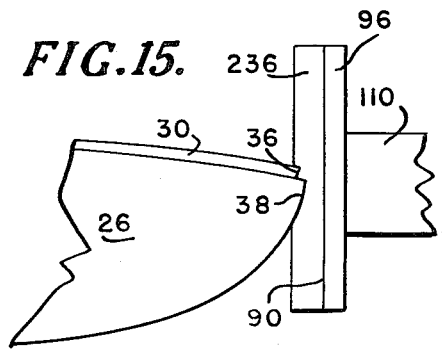
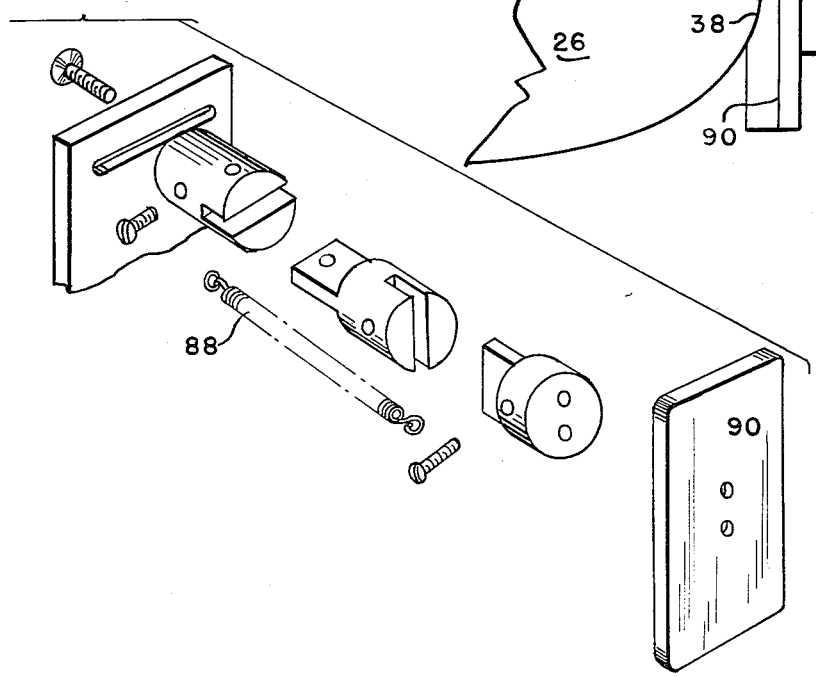
INVENTORS
ROBERT A. SPENCE
JOHN B. REID
BY
Browne, Schuyler & Beveridge
ATTORNEYS United States Patent Office 3,092,861
Patented June 11, 1963

3,092,861
METHOD FOR ASSEMBLING AN INSOLE
WITH A LAST
John B. Reid, Brighton, and Robert A. Spence, South
Lincoln, Mass., assignors to Bain Corporation, Cambridge, Mass., a corporation of Massachusetts
Filed Feb. 21, 1962, Ser. No. 174,839
19 Claims. (Cl. 12—142)

This invention generally relates to the manufacture of footwear, more particularly to a novel method and for automatically aligning and combining, or assembling, an insole with a related last in aligned relation to form a unitary assembled structure as a step in the manufacturing procedure.

In the past, insoles have customarily been secured to the bottom of a related last by means of suitable tack fasteners driven directly through the insole into the last in order to temporarily secure the same in assembled relation after being manually aligned. Regardless of the means employed, the insole must be firmly retained in aligned position on the last so as to withstand the severe lateral and normal stresses imposed during the lasting operation that tend to displace the insole relative to the last. At the same time, the combining procedure formerly employed required precise alignment of the insole with the bottom of a related last which heretofore could only be achieved by a skilled operator capable of manually positioning the components in aligned relation until firmly secured by the customary tack fasteners. Even then, misalignment was possible if the insole became displaced during the combining operation before the components had been firmly secured. Since this operation is an initial step in the assembly and fabrication of footwear, any inaccuracy in alignment of an insole relative to its related last would directly affect the quality of the resultant product.

Therefore, the primary purpose of this invention is the automatic alignment and subsequent combining of an insole with a related last in aligned relation to form a unitary assembled structure regardless of the corresponding contoured outline of the assembled components, as a step in the manufacture of footwear.

The principal object of the present invention relates to a novel method for aligning an insole with the bottom of a related last regardless of the corresponding contoured outlines.

A further object of this invention relates to a method for combining an insole to a related last after the same have been aligned, to form an assembled unit.

A still further object of the present invention resides in a novel method for retaining alignment of the insole with a related last during the combining operation, which method is readily adaptable to meet varying conditions encountered during the manufacture of footwear.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference now being made to the accompanying drawings which form a part hereof, wherein like numerals refer to similar parts throughout, and in which:

FIGURE 1 is a perspective view of an aligning and combining apparatus which forms the subject matter of the present invention.

FIGURE 2(a) is a schematic illustration of a last and related insole shown in misaligned overlapping condition prior to positioning.

FIGURE 2(b) is a schematic illustration similar to FIGURE 2(a) where the heel portion of the last and related insole have been deflected into substantial alignment.

FIGURE 2(c) is a schematic illustration similar to FIGURE 2(b) where the toe portion of the insole has been moved into superimposed position over the last, such that the components are positioned in coincidental alignment.

FIGURE 3 is a side elevational view of the apparatus shown in FIGURE 1, with parts removed.

FIGURE 4 is an end elevational view of the apparatus shown in FIGURE 1, looking toward the front of the machine, with parts removed.

FIGURE 6 is a partial end view of the apparatus shown in FIGURE 1, looking toward the rear of the machine, with parts removed.

FIGURE 8(a) is an exploded perspective view of an insole and related last illustrating the peripheral points of coincidence.

FIGURE 8(b) is an end view of an insole and related last shown in aligned relation.

FIGURE 10 is a side elevation of an alternative embodiment of the present invention, shown in FIGURE 11.

FIGURE 11 is a plan view of an alternative guide system.

FIGURE 12 is a side elevational view of the alternative guide system shown in FIGURE 11.

FIGURE 13 is an end view of the alternative guide system shown in FIGURE 11.

FIGURE 14 is a side elevation, partially in section, of an alternative guide assembly employed in the present invention.

FIGURE 15 is a side view of an alternative contacting guide member employed in the present invention, and FIGURE 16 is an exploded perspective view of a guide assembly utilized in the present invention.

*General Operation*

While specific reference will be made hereinafter to the utilization of double-faced, pressure-sensitive adhesive tape to detachably secure an insole to a related last, it should be understood that the present invention is not limited in any way to the type of securing means employed since it is possible to utilize a conventional fastener, such as tacks or the like, to combine the components into an assembled unit after they have been precisely positioned in aligned relation by the disclosed method.

Figure 7:
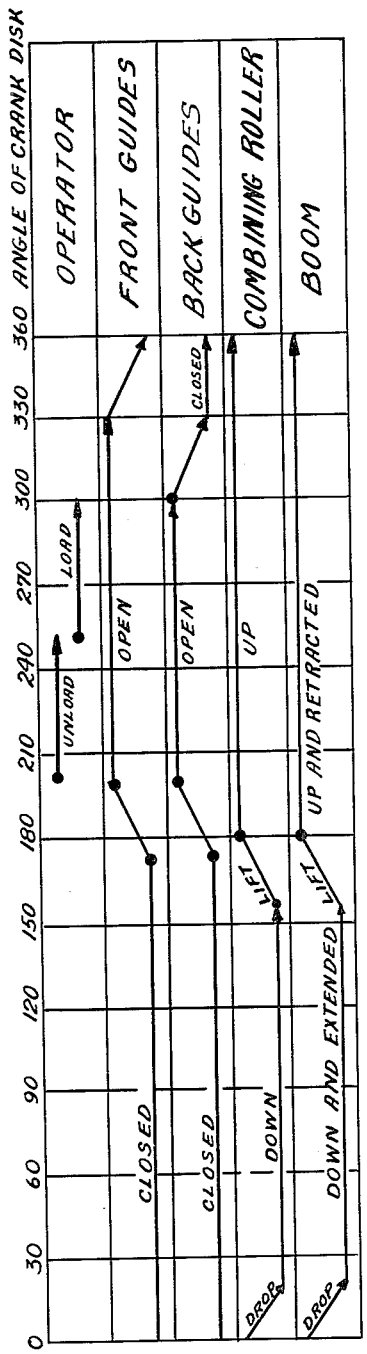
FIGURE 7 is a schematic illustration of the apparatus operating cycle.
Figure 7A:
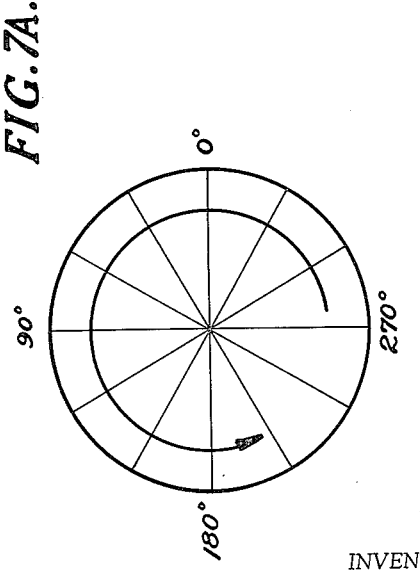
FIGURE 7(a) is a schematic illustration showing the relative angle of the crank disk during the operating cycle referred to in FIGURE 7.

Referring now more particularly to the apparatus illustrated in the accompanying drawings, the machine shown in FIGURE 1 generally includes an associated alignment and combining station 25 for receiving a conventional last 26 and related insole 30 to which tape 40 has previously been applied. The components are automatically positioned in alignment and then combined into a unitary assembled structure. With reference to FIGURE 7 of the drawings, the relative position and functioning of certain major components of the apparatus are generally indicated. The apparatus is so designed that by varying the speed of the driving means, the entire cycle of operation of the machine can be proportionately varied to either increase or decrease the duration or length of the operating cycle, in order to accommodate an operator's skill. Moreover, this machine has been designed to automatically perform the foregoing operations on all types of footwear which require an insole in their construction and are made on a last, including men's, women's, children's and infants' shoes, slippers, moccasins, boots, and the like, of any size or type, either right or left foot regardless of contour or shape. Adjustment means are provided to enable the machine to handle this varied range of work under optimum conditions. For example, the machine is so designed that it is capable of handling all lengths and widths of lasts of varying configurations and shape as well as all types of insoles including those which are of ribbed, channeled, laminated or preformed construction.

Notwithstanding the complete universal adaptation of the machine for performing the required operations previously specified, it can be easily operated by any unskilled person since the operator is merely required to make any adjustments necessary to perform the desired operation, initiate the sequence of operation, load the related insoles and lasts, and finally unload the combined insole and last assembly.

Adjustment of Rests

Figures 3, 4:
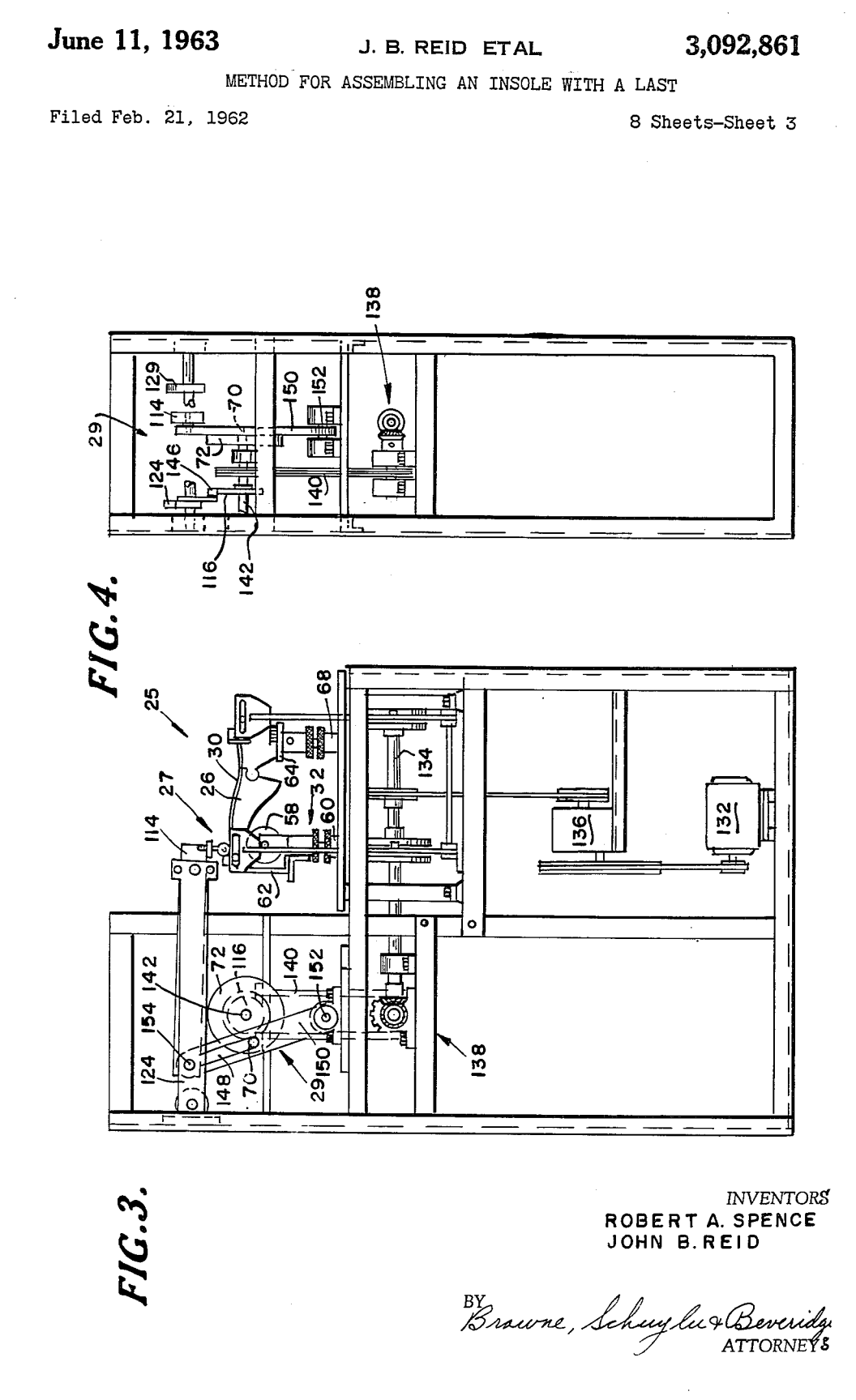
Figure 5:
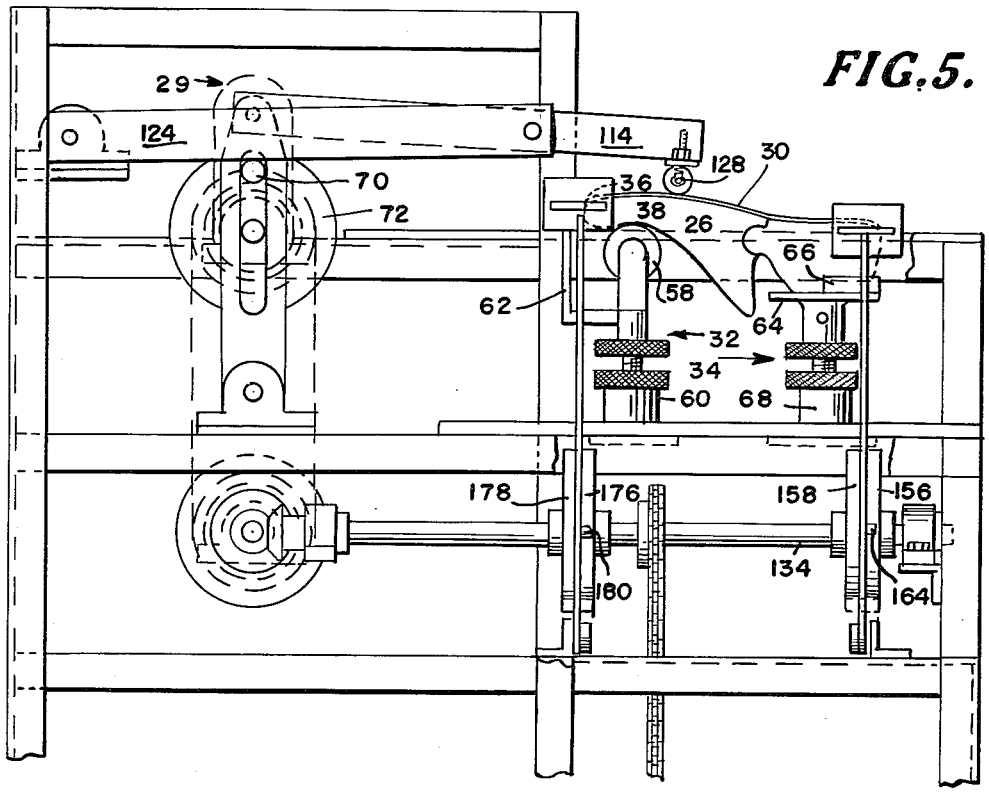
FIGURE 5 is an enlarged partial elevational view similar to FIGURE 3, with parts removed.

After the insole 30 has been taped, for example, in the manner more fully described in our copending application Serial No. 150,037, filed November 3, 1961, now Patent No. 3,052,904, granted September 11, 1962, the disclosure of which is incorporated herein by reference, as a part hereof, it is then ready to be automatically positioned by the instant apparatus in alignment with a related last 26. This apparatus generally includes a horizontal deck portion 28 consisting of two plates 52 and 54 so arranged as to provide a longitudinally extending slot 56 within which the toe and heel rest assemblies 32 and 34, respectively, are slideably mounted and may be moved to make any required adjustments. The toe rest assembly 32 generally consists of a concave shaped roller 58 of rubber, as shown in FIGURES 1, 3 and 5, mounted on a pedestal 60 which is adjustable as to vertical height and longitudinal position. Attached to the toe rest 32 is an upwardly extending toe guide finger 62 which serves to prevent the last 26 and insole 30 from slipping too far forward when they are being initially loaded into the alignment and combining station 25. The heel rest 34 generally consists of a supporting plate 64 with a U-shaped ridge portion 66 extending along the rear edge thereof. The supporting plate 64, in turn, swivels on top of a pedestal 68, as shown in FIGURES 3 and 5. Both toe and heel rest assemblies 32 and 34 are individually adjustable as to their longitudinal position along the deck slot 56 and independently adjustable as to vertical height. The operator manually adjusts the individual rests so that when the last 26 is loaded into the alignment and combining station 25, it will assume an aligned position substantially parallel with slot 56 with the last bottom disposed approximately parallel with the deck 28.

Loading Sequence

Referring now to FIGURE 5, after the toe and heel rests 32 and 34 are adjusted in the manner previously described, the operator loads a last 26 onto the toe and heel rests 32 and 34, and places the previously taped insole 30 on top of the last 26, with the toe portion 36 of the insole facing in the direction of the forepart or toe portion 38 of the last and with the taped side of the insole 30 facing downwardly. As shown in FIGURES 3, 5, 7 and 7(a), the timing sequence is indicated by the angle defined between a line extending from the center of the crank pin follower 70 to the center of the combining roller crank disk 72, and the horizontal. The operator loads the last 26 and its related, previously taped insole 30 into the combining station 25 when the angle of the crank disk 72 is between 250° and 300°.

Positioning of Insole and Last

Although the method of positioning a left foot insole and related last is schematically illustrated in FIGURES 2 and 8, it should be understood that a right foot insole and related last may also be similarly positioned and aligned by the same method and apparatus of this invention without requiring any modification or adjustment of the equipment.

By way of an illustrative embodiment, the operation of the involved method and apparatus will be described in connection with a taped insole. In operation, an insole 30 with its taped side facing downwardly, is manually placed by the operator on top of a related last 26 previously loaded into the associated alignment and combining station 25 without requiring any precise positioning of the insole other than disposing the same in general toe-to-toe relationship. The electrical circuit of the apparatus is then activated by the operator to initiate the operating cycle.

Positioning of Heel

After the insole 30 and related last 26 have been generally positioned in the combining station 25 of the machine, in toe-to-toe relation, a pair of rear or back guide assemblies 42 and 44 move from a remote position to an aligning position whereby the flat double swivel plates 74 and 76, adjustably mounted on arms 78 and 80, respectively, bear against the heel portion 46 of the last 26 deflecting any overlapping portion of the insole 30 projecting beyond the curved shoulder 82 of the last heel transversely and angularly to a substantially superimposed position over the last and longitudinally forward through the swivel action of the plates 74 and 76 until each plate reaches a position substantially tangential to the rear portion of the last heel 46, indicated in FIGURES 8(a) and (b) at points 84 and 86. Each plate is continuously biased by a related spring 88 to retain the planar face 90 in position to contact the heel of the last. The swivel members 92 and 94 on rear guide assemblies 42 and 44 afford a universal movement both up and down and to either side of each assembly, causing the related guide plates 74 and 76 to assume the tangential positions previously described.

Positioning of Toe

After the rear guide assemblies 42 and 44 have moved to aligning position with the plates 74 and 76 in tangential contact with the rear portion of the last heel 46, the front guide assemblies 48 and 50 illustrated in FIGURE 7 move from a remote position to an aligning position whereby the flat double swivel plates 96 and 98, adjustably mounted on arms 100 and 102, respectively, bear against the toe portion 38 of the last 26 deflecting any overlapping portion of the insole 30 projecting beyond the forward curved shoulder 104 of the last toe transversely and angularly to a substantially superimposed position over the last and longitudinally toward the rear guide plate assemblies 42 and 44 through the swivel action of the plates 96 and 98 until each plate reaches a position substantially tangential to the curved shoulder 104 of the last toe portion 38, indicated at points 106 and 108. The left and right front guide assemblies 48 and 50 are also provided with swivels 110 and 112 affording a universal movement both up and down and to either side of the assembly, causing the related guide plates 96 and 98 to assume the tangential positions previously described. Each guide plate 96 and 98 is similarly biased by a related spring 88 to retain the planar face 90 in position to contact the toe portion 38 of the last as it approaches aligning position. The insole 30 is free to shift with respect to the bottom of the last 26 since the adhesive bond of the double-faced, pressure-sensitive adhesive tape 40 has not been developed sufficiently to restrict transverse or longitudinal movement of the insole.

Final Alignment

Since the outlines of a last bottom and of its related insole are customarily congruently contoured, when the insole is positioned and aligned with the last, the contoured outline of both last and insole will coincide as their respective edges are aligned in the manufacture of footwear. When at least three points on the contoured outline of the insole coincide with the corresponding points on the contoured outline of the last, alignment of the insole and the last will result. The four guide tip assembly plates 74, 76, 96 and 98 will bear against last 26 and insole 30 at common points, namely, the tangent points 84 and 86 adjacent the heel portion 46 of the last and tangent points 106 and 108 adjacent the toe portion 38 of the last. Each guide plate is biased against either the last or the insole, exerting sufficient pressure in the direction of the tangential points 84, 86, 106 and 108 through the action of swivels 92, 94, 110 and 112, respectively, to push the insole over the last until each plate contacts both the insole and last. Since the tangent points at heel and toe are common to both insole and last and since the contoured outline of the insole is made congruent to the outline of its related last, the four points of alignment being identical corresponding congruent points on both insole and last are brought downwardly one over the other into aligned substantially coinciding relation with each other. Thus, exact alignment and positioning are obtained. While in the disclosed embodiment, the guide assemblies move transversely, it should be understood that as an alternate method of construction, the toe and heel guide assemblies may be arranged to move in a longitudinal direction, parallel to the center line of the last without changing the principle of alignment.

If the insole is limp or flexible, due to its construction, it will immediately conform to the profile or surface contour of the last bottom when moved to a position of alignment with the last. However, if the insole is of a stiffer construction, the toe portion 36 of the insole will vertically be separated from the last 26 without affecting the aligned relationship.

Combining Operation

At the time the front guides 48 and 50 and the back guides 42 and 44 are in retracted open position, the combining roller assembly 27 is raised and retracted. When the angle of the crank disk 72 has reached approximately 300°, the back guides 42 and 44 close against the insole 30 and last 26 at the tangent points 84 and 86, and at a 330° angle the front guides 48 and 50 begin to close, as schematically shown in FIGURE 7. The front guides 48 and 50 and back guides 42 and 44 cooperate to position the previously taped insole 30 in aligned relation over the last 26.

Thereafter, the combining roller assembly 27, mounted on the combining roller boom arm 114, drops due to the shape of combining roller guide arm cam 116 when the crank disk moves from 0 to 22½°. The combining roller 118 contacts the toe portion 36 of the insole 30 pressing the same downwardly against the last 26, applying pressure due to the combined weight of the mechanism and biasing tension provided by the roller arm tension springs 120. The insole, if separated from the last due to characteristics of stiffness, is forced by the combining roller 118 and guided by the front guide plates 96 and 98 downwardly into aligned relation with the toe portion 38 of the last. At this time the combining phase of the operation is initiated when the angle of the combining roller crank disk 72 reaches 360° or 0°.

The combining roller 118, suspended from boom arm 114 which in turn is slidably supported by roller guides 122 mounted on rocking arms 124, is moved longitudinally toward the heel portion 46 of the last by the action of the combining roller drive assembly 29. The combining roller 118, being mounted on axle 126 and held by swivels 128 at each end of the axle, which are biased by springs 130, will roll across the top of the insole, regardless of surface contour or profile and exert a pressure substantially normal to the area of contact with the insole, developing an adhesive bond between the taped insole 30 and the last 26, and uniting the last and insole into a unitary assembled structure.

When the combining roller 118 has reached a point approximately 1½″ from the heel portion 46 of the last, the combining roller will move upwardly. This lift will begin at an angle of about 152½° of the combining roller crank disk. The combining roller boom arm 114 continues to lift from between 152½° and 180° angle of the crank disk 72 and then, due to the mechanism of the combining roll drive assembly 29, the boom 114 is retracted toward the toe portion 38 of the last, while remaining in the upward remote position. At about 170° crank angle, the front and back guides begin to open and are fully open at 200°. At 200° crank angle, the operator unloads the combined insole and last assembly from the combining station 25 and starts another cycle of alignment and combining.

Power Drive

As shown in FIGURE 3, a suitable power source, such as motor 132, may be employed to drive the main shaft 134 through a variable reduction transmission 136. In turn, the main shaft 134, through a suitable gear train 138 and chain drive 140 directly drives shaft 142 upon which is mounted the crank disk 72 and rocker arm actuating cam 116. The actuating cam 116, in turn, is interconnected with one of the rocker arms 124 through a follower 146 mounted thereon. A connecting rod 150 is pivoted at one end for oscillatory movement about bearing shaft 152 and interconnected at the opposite end with the boom arm 114 about shaft 154 to impart a reciprocating motion to the combining roller arm assembly 27. Oscillation of the connecting rod 150 is initiated through the crank pin follower 70 mounted on crank disk 72, as shown in FIGURE 3. As the crank pin follower 70 rotates upon movement of crank disk 72, it freely slides within a longitudinally extending slot 148 formed in connecting rod 150. Movement of the rocking arms is initiated by the interconnected follower 146 and associated rocker arm actuating cam 116.

Movement of the rear guide assemblies 42 and 44 is controlled by actuating guide cams 156 and 158, respectively, keyed to the main shaft 134. The guide arms 78 and 80 are pivotally interconnected at their lower ends about bearing shafts 160 and 162 to permit transverse oscillatory movement from a remote position to aligning position adjacent the last 26 in the manner previously described. In turn, the arms 78 and 80 are interconnected with the actuating guide cams 156 and 158 through followers 164 mounted on the respective arms. The followers 164 are retained in abutting relation against the related actuating cams 156 and 158 by means of springs 168 and 170, each of which has an end connected to the frame 24 and the opposite end respectively connected to arms 78 and 80 at a point 174 located above the follower.

A similar arrangement is also provided with respect to the front guide assemblies 48 and 50 wherein movement of the front arms 100 and 102 is controlled by actuating guide cams 176 and 178, respectively, keyed to the main shaft 134. The guide arms 100 and 102 are pivotally interconnected at their lower ends about bearing shafts 160 and 162 to permit transverse oscillatory movement from a remote position to aligning position adjacent the last 26 in the manner previously described. In turn, the arms 100 and 102 are interconnected with the actuating guide cams 176 and 178 through followers 180 and 182 mounted on the respective arms. The followers 180 and 182 are retained in abutting relation against the related actuating cams 176 and 178 by means of springs 184 and 186, each of which has an end 172 connected to the frame 24 and the opposite end respectively connected to arms 100 and 102 at a point 174 located above the follower.

Figure 9:
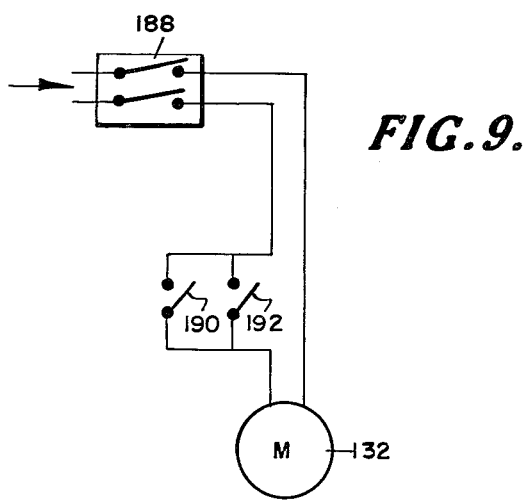
FIGURE 9 is a schematic wiring diagram of the electrical circuit employed.

The motor 132 is electrically interconnected with a suitable source of power through a main switch 188 and actuating control switch 190 connected in series, as shown in FIGURE 9. Intermittent operation of the motor may be performed by utilization of a secondary actuating switch 192, connected in parallel with the control switch 190.

Alternate Guide Systems

As shown in FIGURES 10 through 13, an alternate guide system may be employed to position and combine an insole 30 and its related last 26 in aligned relation. Although a left insole and related last has been illustrated in these figures, it should be understood that a right insole and its related last may be similarly positioned by the same apparatus. The last 26 is supported in the manner previously described on toe and heel rest assemblies 32 and 34.

Two vertical roller guides 200 and 201 are disposed at the toe portion 38 of the last and two vertical roller guides 202 and 203 at the heel 46 of the last, each being respectively supported by a double swivel yoke arm 204. The related front guides 200 and 201, as well as heel guides 202 and 203, are adjustably mounted on a carrying bar 208, the details of which are omitted from the toe portion since they would be merely repetitive. The individual roller guides are free to rotate around pin 210 pivotally mounted in yoke 211. Further, each yoke is biased inwardly by a tension spring 212 interconnected with the swivel arm portion 213. Each swivel arm has a downwardly projecting adjustment member 214 which slideably fits into a related slot 215 formed at opposed ends of the carrying bar 208. The adjustable member 214 is so designed that the roller guides 200–203 and their arms 204 may be laterally adjusted within the slots 215. In turn, the carrying arm 208 is adjustably mounted on a guide arm 216 by adjusting member 217 to permit vertical adjustment. The guide arm 216 oscillates in a longitudinal direction parallel to the center line of the last 26 during the aligning operation previously described.

In operation, after the operator has mounted the last 26 on the toe and heel rests 32 and 34 and placed the previously taped insole 30 on the last, roller guides 202 and 203 move in a longitudinal direction toward the last 26 into tangential contact with the heel portion 46. Thereafter, the front guides 200 and 201 move longitudinally toward the last 26 into tangential contact with the toe portion 38. The roller guides, acting in a similar manner to the front and rear guide assemblies 42, 44, 48 and 50 previously described, push the insole over the last to a position tangent with the last at points 218–221 since the double swivel action permits each roller to contact the insole and last at only one point. Tension springs 212 are provided to keep rollers 200–203 from misalignment when they initially contact the last 26 and insole 30 as well as to provide a lateral force for aligning the insole over the last. Thus the same principle of alignment is employed during operation of the alternate guide system.

However, it should be understood that the roller guides 201 and 203 can be interconnected by a common carrying bar which moves transversely from remote to aligning position simultaneously with roller guides 200 and 202 mounted on an opposed carrying bar. Moreover, roller guides 200–203 may be substituted for swivel plates 74, 76, 96 and 98 without modification since the alignment procedure is identical.

Alternate Guide Tip Assemblies

Referring now to FIGURE 14, an alternate guide construction in which a ball and socket swivel arrangement is employed has been illustrated. This arrangement serves to obtain universal movement similar to that achieved by the double swivel connection shown in FIGURE 16. The guide tip plate 222 is mounted on socket 224 containing a ball joint 226 connected to extension rod 228 retained in interfitting relation by a retainer ring 230. The guide plate 222 freely swivels about the ball and socket assembly and may be laterally adjusted by means of wing nut assembly 232. The opposite end of extension rod 228 can be adjustably connected to guide arms 78, 80, 100 and 102 by means of the threaded lock nut connection 234. Springs 88 are applied to each of the guide tip assemblies between plate 222 and rod 228 as in the manner of the double swiveled type illustrated in FIGURE 16. Moreover, this ball and socket assembly can also be adapted for use with the guide tips shown in FIGURES 11 and 12 which are equipped with rollers.

When a shoe manufacturer utilizing this machine desires to align and combine an insole to a related last where the insole is purposely cut shorter in length than its related last, and is to be positioned in precise alignment with the heel of the last, a varying difference of approximately $\frac{1}{16}''$ between insole toe portion 36 and the last toe 38 exists, as shown in FIGURE 15, requiring modification of the guide tip assembly. A resilient layer, preferably of cellular foam rubber, is secured in any well known manner to the working planar face 90 of the front guide plates 96 and 98 so that in operation, the toe guide assemblies 48 and 50 push the insole 30 over the last 26 and then continue aligning the insole with the last in the direction of the heel portion 46 as the rubber layer 236 carried by the guide tip plate 96 presses against the insole and last. The last 26, being incompressible, compresses a portion of the foam rubber layer 236 at the point of contact while the uncompressed portion continues to press against the shortened insole toe 36 moving it into aligned relation with the heel portion 46 of the last and aligning it properly with the last toe portion 38. Due to the resilient action of the rubber layer, the difference in length between last and insole at the toe end is compensated for. Resiliency of layer 236 can be varied to meet any required conditions. In addition, a similar resilient layer can be applied to the faces of the roller guides 200 and 201 used in aligning the insole and last at the toe end.

It is to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

What is claimed is:

1. In the manufacture of footwear, a method of automatically assembling a contoured insole with a related last having an insole supporting bottom portion generally corresponding in contoured outline with at least a portion of the contoured insole comprising the steps of (1) initially positioning said insole and bottom portion of said last in generally corresponding superimposed relation and (2) aligning the positioned insole and last by applying at least three deflecting forces which mutually cooperate with each other at different points along the periphery of said insole and bottom portion of said last to displace any related overlapping peripheral portion to a position of final alignment where the corresponding contoured outlines of said insole and bottom portion of said last coincide in superposed aligned relation for subsequent combining into a detachably assembled unit.

2. In the manufacture of footwear, a method of automatically assembling a contoured insole with a related last having an insole supporting bottom portion generally corresponding in contoured outline with at least a portion of the contoured insole, as defined in claim 1, wherein at least two of said deflecting forces are initially applied in sequence relative to each other and thereafter mutually cooperate with one another at least until completion of the alignment step.

3. In the manufacture of footwear, a method of automatically assembling a contoured insole with a related last having an insole supporting bottom portion generally corresponding in contoured outline with at least a portion of the contoured insole, as defined in claim 1, wherein said deflecting forces are applied simultaneously.

4. In the manufacture of footwear, a method of automatically assembling a contoured insole with a related last having an insole supporting bottom portion generally corresponding in contoured outline with at least a portion of the contoured insole, as defined in claim 1, including the additional step of (3) subsequently combining the aligned insole and last to form a detachably assembled unit.

5. In the manufacture of footwear, a method of automatically assembling a contoured insole with a related last having an insole supporting bottom portion generally corresponding in contoured outline with at least a portion of the contoured insole, as defined in claim 4, including the additional steps of (4) retaining the corresponding contoured outlines of said insole and bottom portion of said last in superposed aligned relation during the combining step through the mutual cooperation of said deflecting forces and (5) releasing said deflecting forces upon completion of the combining step to permit subsequent removal of the assembled unit.

6. In the manufacture of footwear, a method of automatically assembling a contoured insole with a related last having an insole supporting bottom provided with rear and forepart portions generally corresponding in contoured outline with respective portions of the contoured insole comprising the steps of (1) initially positioning the respective portions of said insole and last bottom in generally corresponding superimposed contacting relation and (2) aligning the positioned insole and last by applying a separate set of associated deflecting forces respectively to the related rear and forepart peripheral portions of said insole and last bottom which individually serve to first deflect any related overlapping peripheral portion into substantially superposed coincidence with the contoured outline of a corresponding peripheral portion and thereafter mutually cooperate with each other to displace the respective portions to a position of final alignment where the corresponding contoured outlines of the rear and forepart portions of said insole and last bottom coincide in superposed aligned relation for subsequent combining into a detachably assembled unit.

7. In the manufacture of footwear, a method of automatically assembling a contoured insole with a related last having an insole supporting bottom provided with rear and forepart portions generally corresponding in contoured outline with respective portions of the contoured insole, as defined in claim 6, including the additional step of (3) subsequently combining the aligned insole and last to form a detachably assembled unit.

8. In the manufacture of footwear, a method of automatically assembling a contoured insole with a related last having an insole supporting bottom provided with rear and forepart portions generally corresponding in contoured outline with respective portions of the contoured insole, as defined in claim 6, wherein the respective rear and forepart portions of said insole and last are sequentially aligned.

9. In the manufacture of footwear, a method of automatically assembling a contoured insole with a related last having an insole supporting bottom provided with rear and forepart portions generally corresponding in contoured outline with respective portions of the contoured insole, as defined in claim 6, wherein the respective rear and forepart portions of said insole and last are simultaneously aligned.

10. In the manufacture of footwear, a method of automatically assembling a contoured insole with a related last having an insole supporting bottom provided with rear and forepart portions generally corresponding in contoured outline with respective portions of the contoured insole, as defined in claim 6, wherein each of said deflecting forces engage the corresponding peripheral portions of said insole and last bottom in tangential contacting relationship during the alignment step.

11. In the manufacture of footwear, a method of automatically assembling a contoured insole with a related last having an insole supporting bottom provided with rear and forepart portions generally corresponding in contoured outline with respective portions of the contoured insole, as defined in claim 10, wherein each of said deflecting forces initially move in a direction substantially transverse to a projected centerline extending longitudinally between the rear and forepart portions of said last bottom and upon making tangential contact with the corresponding peripheral portions of said insole and last bottom, the respective forces each individually deflect any related overlapping portion of said insole transversely as well as longitudinally until the corresponding outline of the last bottom coincides in superposed aligned relation.

12. In the manufacture of footwear, a method of automatically assembling a contoured insole with a related last having an insole supporting bottom provided with rear and forepart portions generally corresponding in contoured outline with respective portions of the contoured insole, as defined in claim 10, wherein each of said deflecting forces initially move in a direction substantially parallel to a projected centerline extending longitudinally between the rear and forepart portions of said last bottom and upon making initial contact with the corresponding peripheral portions of said insole and last bottom, the respective forces each individually deflect any related overlapping portion of said insole longitudinally as well as transversely until the corresponding outline of the last bottom coincides in superposed aligned relation.

13. In the manufacture of footwear, a method of automatically assembling a contoured insole with a related last having an insole supporting bottom provided with heel and toe portions generally corresponding in contoured outline with respective portions of the contoured insole comprising the steps of (1) initially positioning the respective heel and toe portions of said insole and last bottom in generally corresponding superimposed contacting relation, (2) deflecting the heel portion of said insole into substantial alignment with the heel portion of said last bottom, (3) deflecting the toe portion of said insole into substantial alignment with the toe portion of said last bottom while retaining the respective heel portions in substantial alignment and (4) displacing said insole relative to said last bottom through the cooperative deflection of the insole heel and toe portions to a position of final alignment where the contoured outlines of said insole heel and toe portions respectively coincide in superposed aligned relation with the corresponding contoured outlines of the related heel and toe portions of said last bottom for subsequent combining into a detachably assembled unit.

14. In the manufacture of footwear, a method of automatically assembling a contoured insole with a related last having an insole supporting bottom provided with heel and toe portions generally corresponding in contoured outline with respective portions of the contoured insole, as defined in claim 13, including the additional steps of (5) subsequently combining the aligned insole and last to form a detachably assembled unit while the respective heel and toe portions thereof are retained in final alignment and (6) subsequently removing the assembled unit.

15. In the manufacture of footwear, a method of automatically assembling a contoured insole with a related last having an insole supporting bottom provided with heel and toe portions generally corresponding in contoured outline with respective portions of the contoured insole comprising the steps of (1) initially positioning the respective heel and toe portions of said insole and last bottom in generally corresponding superimposed contacting relation, (2) simultaneously deflecting the heel and toe portions of said insole into substantial alignment with the respective heel and toe portions of said last bottom and (3) displacing said insole relative to said last bottom through the cooperative deflection of the insole heel and toe portions to a position of final alignment where the contoured outlines of said insole heel and toe portions respectively coincide in superposed aligned relation with the corresponding contoured outlines of the related heel and toe portions of said last bottom for subsequent combining into a detachably assembled unit.

16. In the manufacture of footwear, a method of automatically assembling a contoured insole with a related last having an insole supporting bottom provided with heel and toe portions generally corresponding in contoured outline with respective portions of the contoured insole, as defined in claim 15, including the additional steps of (4) subsequently combining the aligned insole and last to form a detachably assembled unit while the respective heel and toe portions thereof are retained in final alignment and (5) subsequently removing the assembled unit.

17. In the manufacture of footwear, a method of automatically assembling a contoured insole with a related last having an insole supporting bottom portion generally corresponding in contoured outline with at least a portion of the contoured insole comprising the steps of (1) applying adhesive material to one face of said insole, (2) initially positioning said insole and bottom portion of said last in generally corresponding superimposed relation with said adhesive material interposed therebetween, (3) applying at least three alignment forces at different points along the periphery of said insole and the bottom portion of said last which mutually cooperate to displace any overlapping portion to a position of final alignment where the corresponding contoured outlines of said insole and bottom portion of said last coincide in superposed aligned relation, (4) bonding the aligned insole to said last with said adhesive material while the same are retained in final alignment to form a detachably assembled unit, and (5) subsequently removing the assembled unit.

18. In the manufacture of footwear, a method of automatically assembling a contoured insole with a related last having an insole supporting bottom portion generally corresponding with at least a portion of the contoured insole, as defined in claim 17, wherein said adhesive material is in the form of double-faced, pressure-sensitive tape.

19. In the manufacture of footwear, a method of automatically assembling a contoured insole and related last having an insole supporting surface which generally corresponds in peripheral outline with at least a portion of the peripheral contour of said insole comprising the steps of (1) establishing at least three corresponding points of coincidence along the respective peripheral contours of said insole and last and (2) displacing any related overlapping peripheral portion to a position of final alignment by moving the corresponding points established along the peripheral contours of said insole and last into superposed coincidence.

References Cited in the file of this patent

UNITED STATES PATENTS

| | | |
|---|---|---|
| 267,076 | Hall | Nov. 7, 1882 |
| 1,365,221 | Blake | Jan. 11, 1921 |
| 1,517,973 | Fernald | Dec. 2, 1924 |
| 1,674,060 | Pym | June 19, 1928 |
| 1,674,061 | Pym | June 19, 1928 |
| 2,119,591 | Mawbey | June 7, 1938 |
| 2,149,391 | Finn | Mar. 7, 1939 |
| 2,236,623 | Finn | Apr. 1, 1941 |
| 2,291,630 | Jorgensen | Aug. 4, 1942 |
| 2,384,003 | Bazzoni | Sept. 4, 1945 |
| 2,501,789 | Senfleben | Mar. 28, 1950 |
| 2,508,574 | Jorgensen | May 23, 1950 |
| 2,701,887 | Nolan | Feb. 15, 1955 |
| 2,984,847 | Maeser | May 23, 1961 |